Oct. 23, 1934.  J. T. FREESTONE  1,977,760
STERILIZATION OF THE ATMOSPHERE OF ROOMS OR ENCLOSED SPACES
Filed April 7, 1933  2 Sheets-Sheet 2
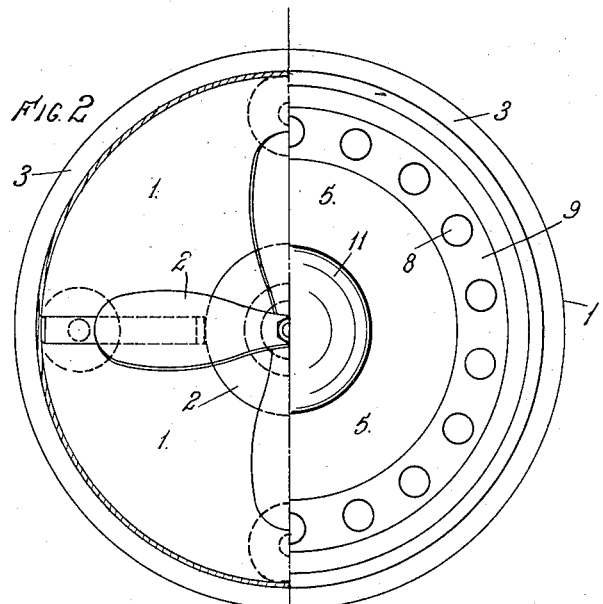
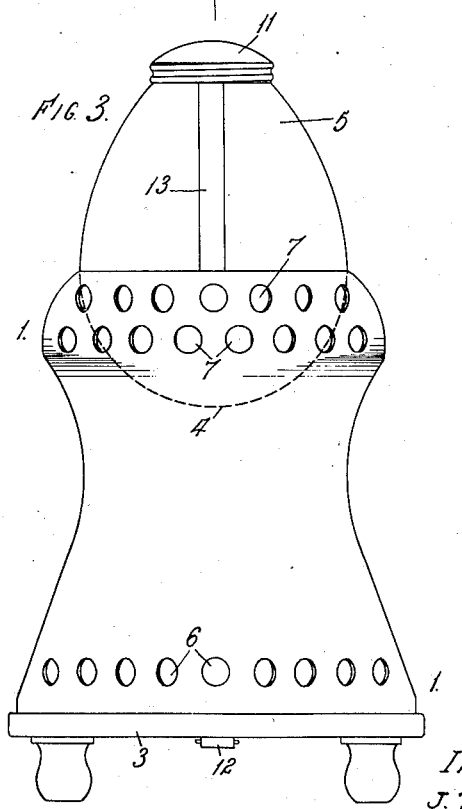
INVENTOR
J. T. FREESTONE
By
Atty.

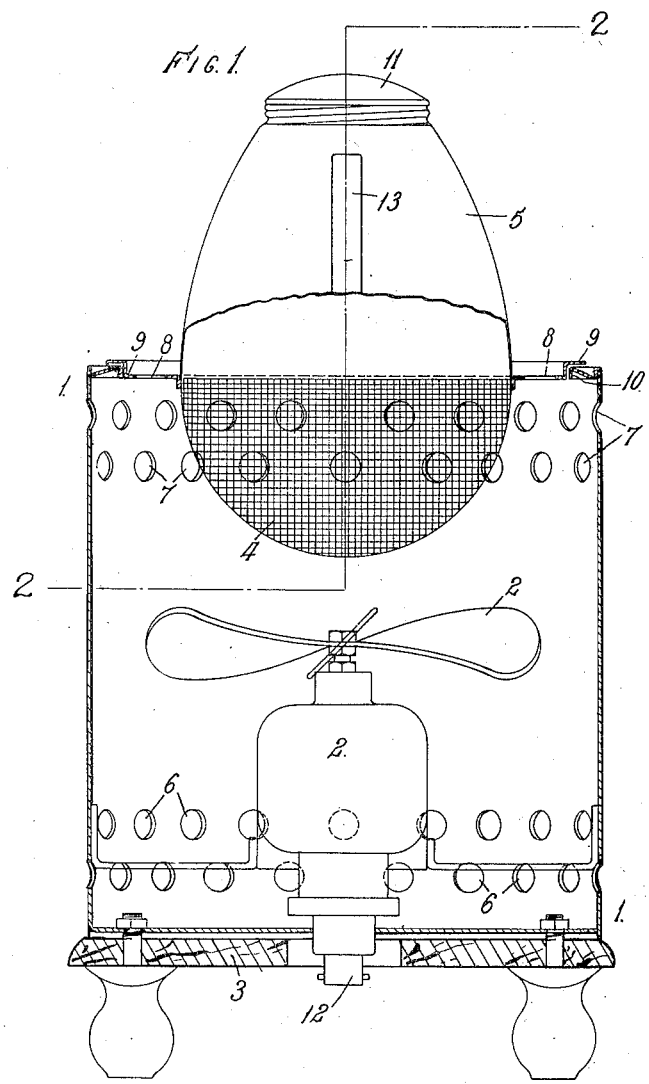

Patented Oct. 23, 1934

1,977,760

UNITED STATES PATENT OFFICE 1,977,760

STERILIZATION OF THE ATMOSPHERE OF ROOMS OR ENCLOSED SPACES

Joseph Thomas Freestone, Liverpool, England

Application April 7, 1933, Serial No. 664,989
In Great Britain April 16, 1932

5 Claims. (Cl. 167—3)

The object of this invention is to provide a sterilized atmosphere in every part of rooms or enclosed spaces, that is an atmosphere sterile to all microbic and germ life; namely, to provide improvements in connection with the means for sterilizing the air or atmosphere in rooms or enclosed spaces, by which the above conditions shall be constantly and uniformly maintained.

The above object of providing a sterilized atmosphere in rooms or enclosed spaces has hitherto been proposed by means in which the sterilizing medium, such as para-dichloro-benzene has been held in a perforated container, and over the surface of which air has been passed by the agency of an electrically driven fan; but the surface or area of the sterilizing material which has been acted on by the air has not been constant, but by this invention this factor of constancy of area acted on by the air is accomplished; and it is effected by making the container for the para-dichloro-benzene or equivalent material to constitute a storage and feed chamber for the material as well as a part for the exposure of a part of the material to the action of the air which is forced thereover and into the enclosed space or room, so that such latter part or area of material is kept constant.

If the sterilizing material specified in the form of crystals be used the atmosphere is non-toxic, or not hurtful or uncomfortable to those in the room, such as patients in hospitals and nursing homes, or persons occupying a room or enclosed space, such as school children, work people in workshops, storage rooms etc.

To produce this constant area of material to be acted on by the air so that the air supplied from the vaporizing or charging apparatus shall be of a constant sterilizing quality, that part of the container, which is of perforated or meshwork form, will be continuously replenished and kept full of the material, which effect is obtained by providing a part of the container above the mesh work holder portion with a quantity of the material, so that as the material in the mesh work holder part is used up or evaporated, it is replenished by the material in the closed portion of the reservoir or container, moving down by gravity into the perforated holder portion.

The size of openings or mesh should be such that they freely admit the air coming in direct contact with and flowing over the surface of the crystals in the container, so that although they are vaporized and gradually reduced in size, the reduced grains of the material will not fall out, but are held until completely vaporized; and although the material is being constantly evaporated by contact of the air, the contact area of the material is, as stated, continuously maintained.

By this means the supply of the sterilized medium to the air or atmosphere is in constant ratio, so that the quality of the charged air is kept at such a degree of constancy that the charged air all over the room or space will be inimical to germ or microbic life.

An example of apparatus according to this invention is illustrated by the annexed drawings, in which Figure 1 is a sectional elevation of the apparatus; Figure 2 is a sectional view on the line 2—2 of Figure 1; and Figure 3 is an outside elevation of a modified form of apparatus.

The apparatus shown is of a vertical type, but it may be so arranged that the air is caused to flow over the material in the gauze container in a horizontal or inclined direction, so that the streams or stream of air carrying with it the vapour of para-dichloro-benzene will be directed into and along the rooms or spaces horizontally.

Referring now to the drawings, 1 is the vaporizing chamber, having within it, at the lower part, an electrically driven air forcing fan 2, fixed to the base 3 of the chamber.

The container for the para-dichloro-benzene consists of two parts, the lower part 4 of wire gauze, and the feed or storage chamber part 5 above. The gauze vaporizing part 4 which is exposed to the action of the air, lies within the upper part of the evaporating chamber 1.

The air to be charged with vapour is admitted to the interior of the chamber 1 through two rows of holes 6 in its walls near the bottom; whilst the vapour charged air is discharged into the space to be treated, through holes 7 in the upper part of the body or chamber 1, and the ring of holes 8 around the store vessel 5; the total area of these latter apertures being greater than that of the lower apertures, so that there is no serious contra pressure to the escape of air.

In the case shown, the holder of the material 4, 5, is carried in a removable part 9, which is in the form of a removable lid, and is adapted to be fixed in a removable manner in the upper ring 10 of the chamber 1, this construction being in the form say of a tin lever lid and neck.

The container is closed at the top by a screw cap 11, by means of which when removed the store or feeder part of the container can be recharged with material.

In operation, when the container 4, 5, is charged with the material, and the fan is set in action by the electro fan 2, to which current is supplied through the adapter connection 12, air will be forced by the fan over the whole gauze or open work surface of the portion 4; and flowing over same will come freely into contact with, and absorb or evaporate this material—which is highly evaporable; and the air charged with the vapour will be forced through the apertures 7, 8, and into the atmosphere in which the apparatus is placed. These currents of charged air will be transmitted and distributed throughout the room in which the apparatus is used; and the artificially produced currents will reach every part of the room and the atmosphere in it, which at all parts will be set in motion; and consequnetly, germ life in the atmosphere throughout the room will be acted upon and destroyed, so that a thoroughly pure air will pervade the whole space of the room.

In order that free evaporation of the para-dichloro-benzene will take place, and that no crystals of the material will fall through the mesh of the gauze, this mesh will be so small that this cannot take place. For instance, the gauze may have about $\frac{1}{16}$" apertures.

In order that the quantity of material in the container can be known, a vertical window 13, say of transparent medium, or gauze, will be provided in it, so that the level of the material can be seen.

In the case shown, the apparatus may be assumed to be one which will be used within the room, the atmosphere of which is to be treated; but in other cases, the apparatus may be such that it can be placed outside the room, and the air admitted to it by the method described, in which case the treated air will be carried from it by a conduit, and led by it to the room or space, the air of which is to be purified. Further one or more of such apparatus may be employed for conducting vapour charged air to any or all of several rooms.

Figure 3 shows a modified form of the apparatus shown in Figures 1 and 2, but the operations which take place in same, will be identical with those above described.

In this apparatus the para-dichloro-benzene holder apparatus is placed in line of the stream or streams of air moved by the fan in passing through the apparatus, so that the easy and sure vaporization of the material, and charging of the air with the vapour is promoted.

By varying the velocity of the air by duly controlling the revolution of the air moving fan or the like, a variable rate of supply of charged air or atmosphere can be delivered into the room per unit of time.

To render the air sterile, only a very small percentage of the para-dichloro-benzene is required.

Whilst the invention has been described as applied to cases in which para-dichloro-benzene is used as the vaporizable sanitizing medium, any material of an equivalent or analogous nature which is or will be inimical to microbic or germ life can be used in connection with the apparatus and system.

What is claimed is:—

1. Apparatus for sterilizing the atmosphere of an enclosed space comprising in combination a perforated container for sterilizing material in crystal form, an imperforate storage chamber for the sterilizing material located above the perforated container, a conduit connecting the storage chamber with the perforated container whereby the latter is maintained in a filled condition from the storage chamber by gravity, means for forcing the atmosphere of the enclosed space past the perforated container, and a guide for directing the forced atmosphere into contact with the container.

2. Apparatus for sterilizing the atmosphere of an enclosed space comprising in combination a container for sterilizing material in crystal form having an imperforate storage chamber located above a perforate exposure chamber, means for forcing the atmosphere of the enclosed space over the container, and a guide for directing the forced atmosphere into contact with the container.

3. Apparatus for sterilizing the atmosphere of an enclosed space comprising in combination a casing having an inlet and an outlet aperture, a container for sterilizing material in crystal form including an exposure chamber located within the casing and a storage chamber located beyond the casing, the said storage chamber being located above the exposure chamber to maintain the latter full of crystals, a fan located at the inlet end of the casing for forcing the atmosphere from the enclosed space past the crystalline material in the exposure chamber, and means for driving the fan.

4. An apparatus for sterilizing the atmosphere of an enclosed space comprising in combination a casing having an inlet and an outlet, a container for sterilizing material in crystal form having a storage chamber located beyond the casing and above an exposure chamber situated within the casing and of such a size as to permit free passage of air over the surface of the exposure chamber, and through the outlet of the casing, and a motor-driven fan located at the inlet end of the casing.

5. Apparatus for sterilizing the air of an enclosed space comprising a container filled with para-dichloro-benzene crystals having its lower walls formed of gauze, and its upper walls imperforate, whereby a constant surface of para-dichloro-benzene crystals is exposed to the action of air forced over the container into the enclosed space.

JOSEPH THOMAS FREESTONE.